US00RE36920E

United States Patent [19]

De Kesel

[11] E Patent Number: Re. 36,920

[45] Reissued Date of Patent: Oct. 17, 2000

[54] SEAL FOR A TONER CARTRIDGE ASSEMBLY

[76] Inventor: Jan De Kesel, J.B. Lombaertdreef 21, B-9810 Drongen, Belgium

[21] Appl. No.: 08/932,203

[22] Filed: Sep. 17, 1997

Related U.S. Patent Documents

Reissue of:

[64] Patent No.: 5,523,828
Issued: Jun. 4, 1996
Appl. No.: 08/305,707
Filed: Sep. 14, 1994

[51] Int. Cl.[7] ..... G03G 15/08

[52] U.S. Cl. ..... 399/106; 222/DIG. 1; 399/109

[58] Field of Search ..... 399/106, 109; 222/DIG. 1

[56] References Cited

U.S. PATENT DOCUMENTS

| | | | |
|---|---|---|---|
| Re. 35,529 | 6/1997 | Michlin | 399/106 |
| 4,062,385 | 12/1977 | Katusha et al. . | |
| 4,491,161 | 1/1985 | Tamura et al. . | |
| 4,538,651 | 9/1985 | Lykins . | |
| 4,614,286 | 9/1986 | Yamaguchi et al. . | |
| 4,778,086 | 10/1988 | Shibata et al. . | |
| 4,862,210 | 8/1989 | Woolley | 399/106 |
| 4,924,920 | 5/1990 | Bhagwat . | |
| 4,931,838 | 6/1990 | Ban et al. | 399/106 |
| 4,937,628 | 6/1990 | Cipolla et al. . | |
| 4,981,218 | 1/1991 | Ban et al. . | |
| 4,982,771 | 1/1991 | Bertram et al. . | |
| 4,986,673 | 1/1991 | Bell . | |
| 5,027,156 | 6/1991 | Kobayashi . | |
| 5,030,998 | 7/1991 | Shibata et al. . | |
| 5,110,646 | 5/1992 | Prestel et al. | 428/43 |
| 5,150,807 | 9/1992 | Seyfried et al. . | |
| 5,177,540 | 1/1993 | Honda et al. | 399/106 |
| 5,258,814 | 11/1993 | Davies | 399/105 |
| 5,282,003 | 1/1994 | Michlin | 399/109 X |
| 5,296,902 | 3/1994 | Michlin | 399/109 |
| 5,331,372 | 7/1994 | Tsuda et al. . | |
| 5,434,656 | 7/1995 | Nagaoka et al. . | |
| 5,621,508 | 4/1997 | McNamara | 399/106 |
| 5,799,712 | 9/1998 | Kelly et al. . | |
| 5,867,751 | 2/1999 | Nomura et al. . | |
| 5,884,124 | 3/1999 | Karakama et al. . | |
| 5,909,606 | 6/1999 | Fujiwara . | |

FOREIGN PATENT DOCUMENTS

| | | |
|---|---|---|
| 631207 | 12/1994 | European Pat. Off. . |
| 638851 | 2/1995 | European Pat. Off. . |
| 1-209465 | 8/1989 | Japan . |
| 1-315779 | 12/1989 | Japan . |
| 1243535 | 8/1971 | United Kingdom . |

*Primary Examiner*—William J. Royer
*Attorney, Agent, or Firm*—Charles E. Temko

[57] ABSTRACT

A seal for a toner cartridge assembly used in printers, copy machines and facsimile machines. The seal is a strip which can be torn out so as to define an opening for the passage of toner. The strip has a structure which lowers the tearing force required when starting to tear the strip with respect to the tearing force required for other parts of the seal, or the seal has a structure which increases the binding of parts of the seal adjacent to the strip on the cartridge.

75 Claims, 6 Drawing Sheets

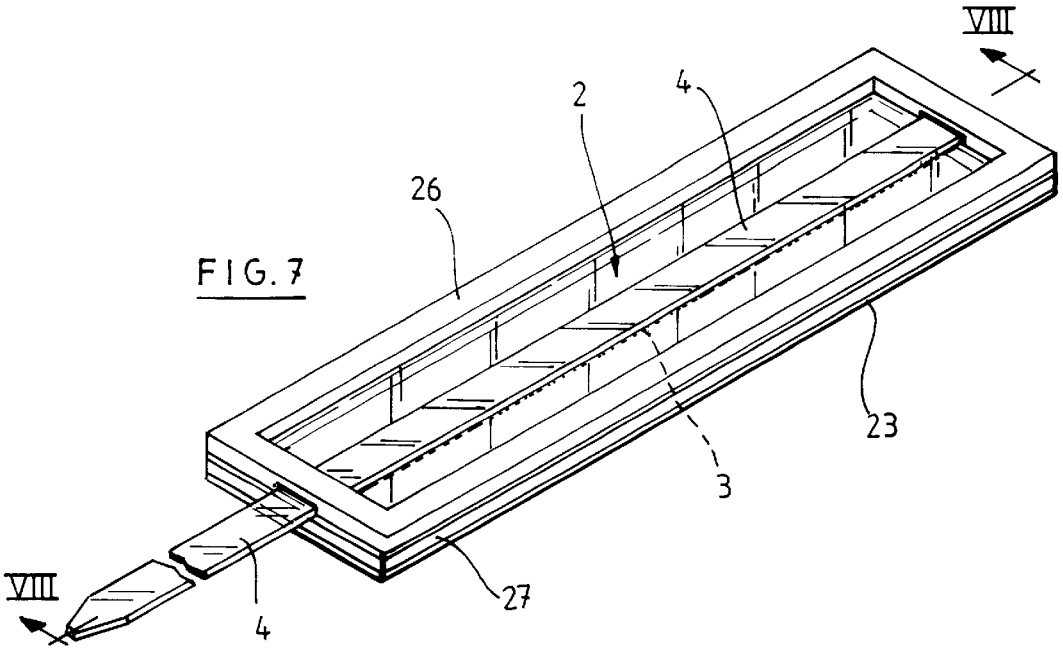
FIG. 7
FIG. 8
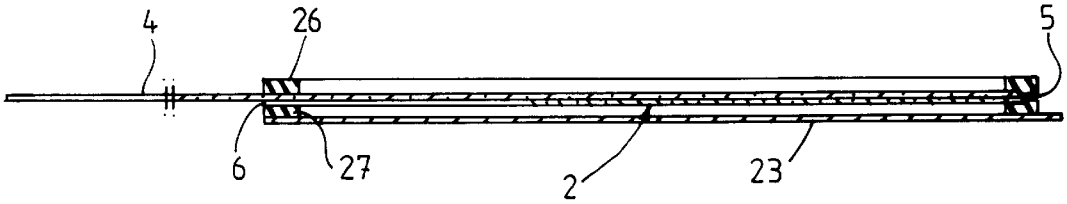
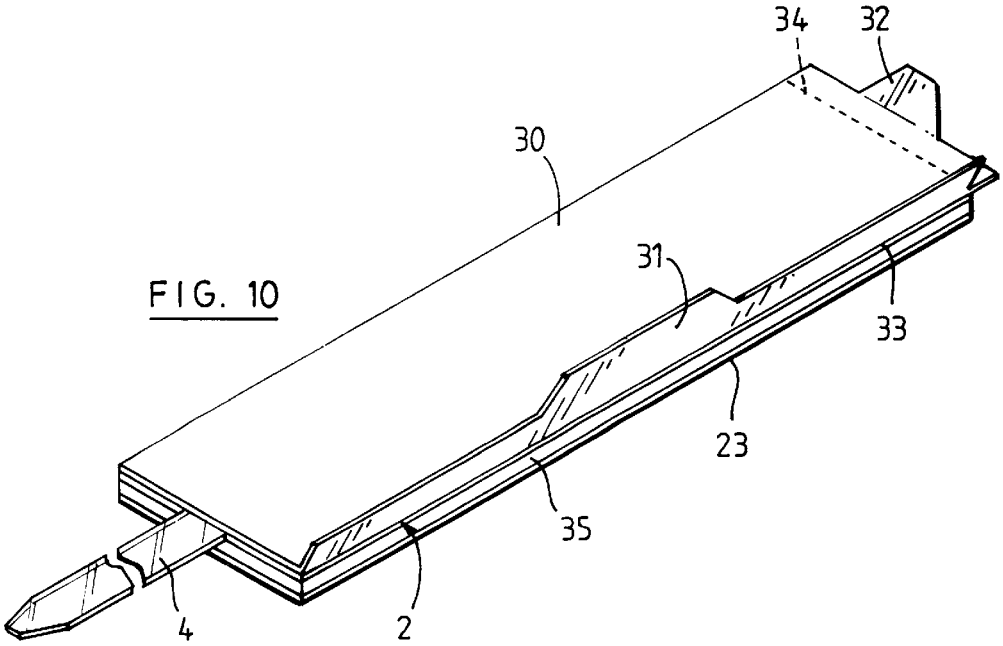
FIG. 10

SEAL FOR A TONER CARTRIDGE ASSEMBLY

Matter enclosed in heavy brackets [ ] appears in the original patent but forms no part of this reissue specification; matter printed in italics indicates the additions made by reissue.

THE STATE OF THE ART

Seals in the form of a film comprising a strip which can be torn out have already been used in toner cartridge assembly of printers, copy machines and facsimile machines.

Such seals are preferred with respect to the seals disclosed in U.S. Pat. No. 5,296,902 as in the latter seals, it is necessary to manufacture slotted seal inserts having a slot with very accurate dimensions. Furthermore, the film closing the slot is glued to the insert, whereby when peeling the film away from the slot, said slot can be damaged if the insert is not sufficiently rigid. The seals according to this U.S. patent are seals used to permit the recharging of a toner cartridge.

Seals in the form of a film comprising a strip which can be torn out are often used for new cartridges, i.e. not for recharging toner cartridges. Recently, Applicant has proposed a seal of this kind suitable for recharging toner cartridges.

The major drawback of these kind of seals is that when tearing the strip, there is a risk that the film is also partly torn out and extends into the passage of toner.

The present invention relates to an improved seal for a new toner cartridge assembly as well *as* for a re-used toner cartridge, i.e. a re-charged cartridge, said seal preventing the risk of incorrect tearing or the existing seals.

BRIEF DESCRIPTION OF THE INVENTION

The invention relates to a seal for a toner cartridge assembly used in printers, copy machines and facsimile machines and preventing the loss of toner from said cartridge assembly during handling and shipment. The seal comprises a layer from which a strip can be torn out so as to define an opening for the passage of toner with respect to the part of the layer which has not been torn out. The layer is preferably unperforated in its parts intended to define the passage for the toner or in its part intended to close the passage of toner out of the cartridge. Said strip is linked to an element to be pulled for tearing out the strip from a first end part of the strip up to another end part of said strip, whereby when the first end part of the strip is not torn, the strip prevents the loss or leakage of toner from the cartridge, while when the strip is torn up to its other end part, the opening for the passage of toner is formed. According to the invention, the strip is provided at its first end part with a means lowering the tearing force required when starting to tear the strip with respect to the tearing force required to tearing other parts of the seal, or the part or parts of the seal adjacent to said first end are provided with a means intended to increase the binding or linking of said part or parts of the seal on the cartridge.

The seal has edges intended to be attached by linking means, such as glue, to the toner cartridge.

Preferably, said first end part of the strip is at least partly intended to be attached by a linking means, such as glue, to the toner cartridge.

According to an embodiment, the seal has edges or lateral parts adjacent to said edges intended to be attached by linking means to the toner cartridge, while said first end part of the strip is at least partly intended to be attached by a linking means to the toner cartridge, said means for lowering the tearing force extending at most in the end part of the strip intended to be attached by a linking means to the toner cartridge.

According to a first embodiment, the means for lowering the tearing force extending at most in the end part of the strip intended to be attached by a linking means to the toner cartridge. Said means for lowering the tearing force consists of at least one aperture situated between the strip to be torn and a part of the seal which has not to be torn.

According to a second embodiment, the means for lowering the tearing force consists of two rows of holes, preferably two substantially parallel rows of holes, between which the first end part or the strip is located, whereby said rows are situated between parts of the strip to be torn and parts of the seal which have not to be torn. Said rows of holes extend preferably on a distance of at most 1 cm, most preferably of 0.5 cm from a free edge of the seal or from the end of the strip adjacent to the pulling element.

According to a third embodiment, the means for lowering the tearing force consists of two cuttings, preferably two parallel cuttings, between which the first end part is located, whereby said cuttings are situated between a part of the strip to be torn and parts of the seal which have not to be torn. Said cuttings extend preferably on a distance of at most 1 cm, more preferably of 0.5 cm from a free edge of the seal from the end of the strip adjacent to the pulling element.

According to a fourth embodiment, the means for lowering the tearing force consists of two grooves, advantageously parallel grooves, between which the first end part is located whereby said grooves are situated between a part of the strip to be torn and parts of the seal which have to be torn. Said grooves extend preferably on a distance of at most 1 cm, more preferably of 0.5 cm from a free edge of the seal or from the end of the strip adjacent to the pulling element.

According to a preferred embodiment, the means for lowering the tearing force consists of:

- an opening situated adjacent to said first end and between two parts of the seal which have not to be torn, or
- an opening situated adjacent to said first end and between two parts of the seal which are intended to be attached by a linking means on the toner cartridge.

For the seal according to the invention which comprises part or parts adjacent to the first end of the strip provided or intended to be provided with a means for increasing the binding or linking of said part or parts of the seal on the cartridge, said means can be for example:

- a glue with higher adhesive force than the glue used for attaching other parts of the seal to the cartridge,
- a foam layer pressing said part or parts on the cartridge, so that said part or parts are more pressed on the cartridge than said first end of the strip,
- a foam layer acting on said part or parts so as to press it or them on the cartridge, while not pressing the first end of the strip on the cartridge,
- leg or legs linked to the seal in the neighborhood of the first end part of the strip, said leg or legs being intended to be attached or linked to the toner cartridge.

The invention relates also to a toner cartridge assembly used in printers, copy machines and facsimile machines. The cartridge is provided with a seal for preventing the loss or leakage of toner from said cartridge assembly during handling and shipment. The seal is a seal according to the invention as disclosed heretofore or possibly hereafter. The seal comprises a layer from which a strip can be torn out so as to define an opening for the passage of toner with respect to the part of the layer which has not been torn out, said strip being linked to an element to be pulled for tearing the strip from a first end part of which up to another end part of which, whereby when the first end part of the strip has not been torn, the strip prevents the loss of leakage of toner from the cartridge, while when the strip has torn up to its end, the opening for the passage of toner is formed.

The strip is provided as its first end part with a means lowering the tearing force required when starting to tear the strip with respect to the tearing force required for tearing other parts of the seal, or the part or parts of the seal adjacent to said first end are provided with a means intended to increase the binding or linking of said part or parts of the seal on the cartridge.

Advantageously, the seal of the toner cartridge has edges or lateral parts adjacent to said edges attached by linking means on the toner cartridge, while said first end part of the strip is at least partly attached by a linking means to the toner cartridge, said means for lowering of the tearing force extending at most in the end part of the strip attached by a linking means, such as glue, to the toner cartridge.

The means for lowering the tearing force consists for example of:

- at least one aperture situated between the strip to be torn and a part of the seal which has not to be torn;
- two rows of holes between which the first end part of the strip is located, whereby said rows are situated between parts of the strip to be torn and parts of the seal which have not to be torn;
- two cuttings, between which the first end part is located, whereby said cuttings are situated between a part of the strip to be torn and parts of the seal which have not to be torn;
- two grooves between which the first end part is located, whereby said grooves are situated between the strip to be torn and parts of the seal which have not to be torn; or preferably an opening situated adjacent to said first end and between two parts of the seal which have not been torn.

According to an embodiment of the seal of the invention, at least one face of the part of the layer not intended to be torn out is at least partly provided with a glue layer for attaching it to the toner cartridge. Preferably, said first end part of the strip is also at least partly provided with a glue layer for attaching it to the toner cartridge.

According to a further embodiment, at least one face of the part of the layer not intended to be torn out, is at least partly provided with glue for attaching it to a slotted support intended to be attached to the toner cartridge. In said embodiment, said first end part of the strip is also for example at least partly linked by means of a glue layer to the slotted support. Preferably, the other end of the strip is also glued to the slotted support. Preferably the glue used for attaching said first end has a lower binding force than that of the glue used for attaching parts of the layer which have not to be torn out.

A face of the seal can also be provided with a foam layer intended to be linked to the toner cartridge, or can be provided at least along two opposite lateral and preferably along its cross edges, with foam, said foam being intended to be attached to the toner cartridge by means for example of glue.

Advantageously, the two opposite faces of the seal are provided at least along two opposite lateral edges with foam, said seal being intended to be placed between a toner cartridge and a support for a toner roller. This embodiment is suitable for being used for the re-charging of a toner cartridge assembly which requires the separation of the toner cartridge from the toner roller support.

Advantageously, the element to be pulled is engaged between foam, for example a part of a slotted foam insert, and the seal, for example an end of the strip, whereby there is no glue between said part of the foam and the seal or whereby there is a means between said part of the foam and the seal or the pulling element, such as a bridge for facilitating the pulling of the element. Said bridge or means limit or avoid the pressure of the element on the seal due to the foam.

Details and characteristics of preferred embodiments according to the invention given as examples, only, will be disclosed in the following description.

BRIEF DESCRIPTION OF THE DRAWINGS

FIG. 7 is a perspective view of a further embodiment of a seal of the invention;

FIG. 8 is a cross-section view along the line VIII—VIII of FIG. 7;

FIG. 10 is a perspective view of a further embodiment of a seal according to the invention;

DESCRIPTION OF EMBODIMENTS

Figure 1:
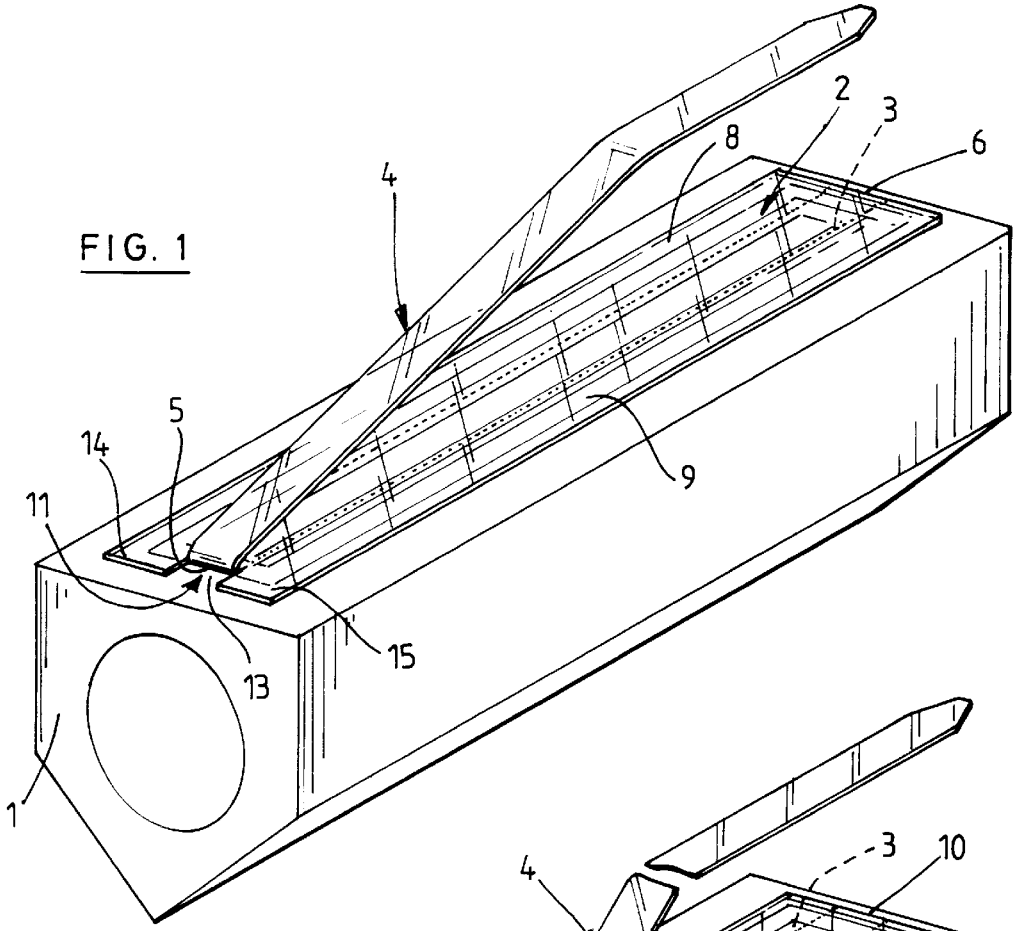
FIG. 1 is a perspective view of a cartridge provided with a seal according to the invention.
Figure 2:
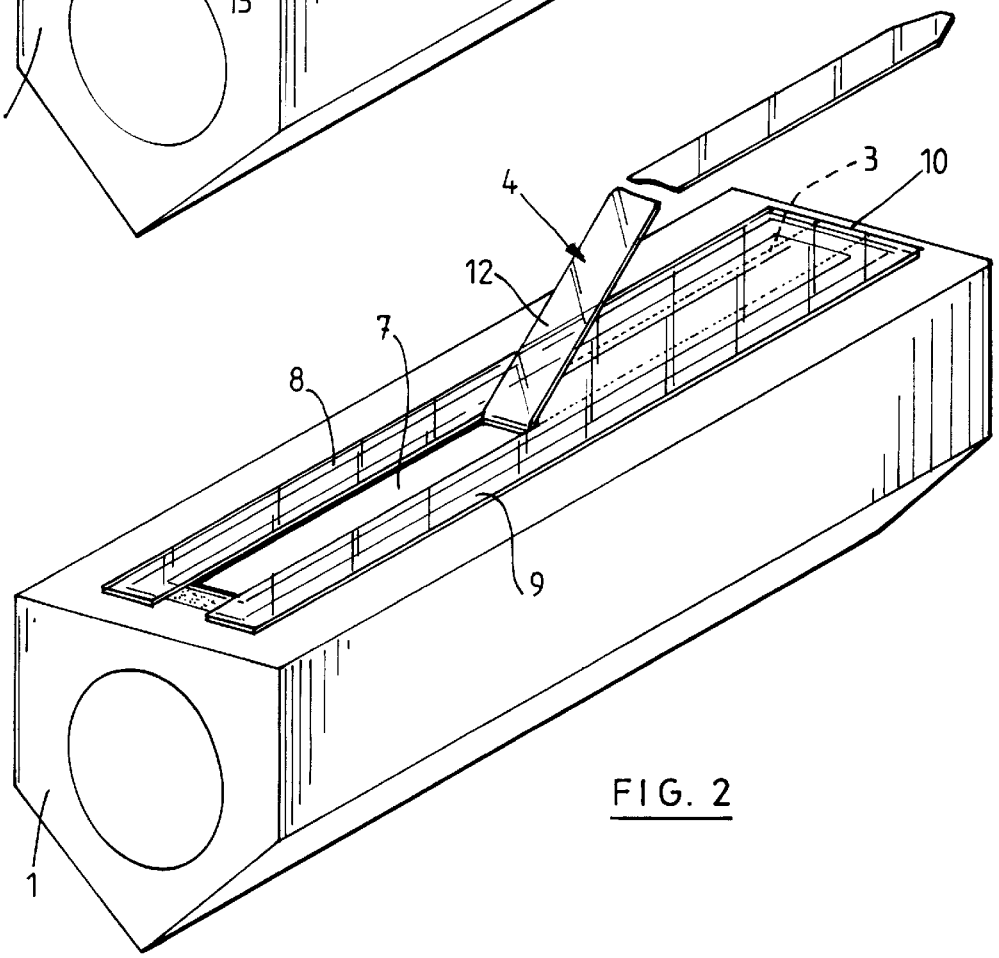
FIG. 2 is a perspective view similar to FIG. 1 during the tearing out of the strip.

FIGS. 1 and 2 show a toner cartridge 1 provided with a seal 2. Said seal 2 is for example an unperforated film comprising fibers extending in a direction along which a central strip 3 has to be torn. Said central strip 3 can be torn by pulling a tongue 4 from a first end part 5 up to a second end part 6. When the first end part 5 is not torn, the strip closes an opening 7 through which the toner can pass and therefore prevents the loss or leakage of toner. When the central strip 3 is torn up to the second end 6 and is therefore removed, the opening 7 is formed. In the embodiment shown, the width of the opening 7 is defined by the width of the central strip 3 to be torn.

Lateral strips or parts 8,9 of the seal, i.e. along its lateral edges, are glued on the cartridge. Between the glue lines of the lateral strips 8,9, two cross glue lines extend, a first acting as means for attaching the first end part 5 to the cartridge, while the other acting as means for attaching a lateral edge 10 of the seal adjacent to the second end part 6, and thus the second end part 6.

The first end of the strip is provided with a means 11 for lowering the tearing force when starting to tear the central strip 3, for example so that the initial tearing force is lower or equal to the tearing force of part 12 of the strip located above the opening 7.

Said means acts also as means for preventing the tearing of parts of the seal which have not to be torn, thereby preventing parts of the seal which have not to be torn to extend after tearing of the strip within the passage for the toner.

Said means 11 consists of an opening 13 adjacent to the first end part 5 and situated between two legs or parts 14,15 of the seal 2 which are at least partly glued on the toner cartridge.

Said legs 14,15 ensure a good adhesion of the seal near the first end part 5 of the strip and prevent the tearing of the lateral strips 8,9 of the seal 2 when tearing the central strip 3. Said legs increase therefore the binding of the seal in the neighborhood of the first end part.

Advantageously, the tongue 4 is curved at first end part 5, whereby the tearing force is still lowered.

Figure 3:
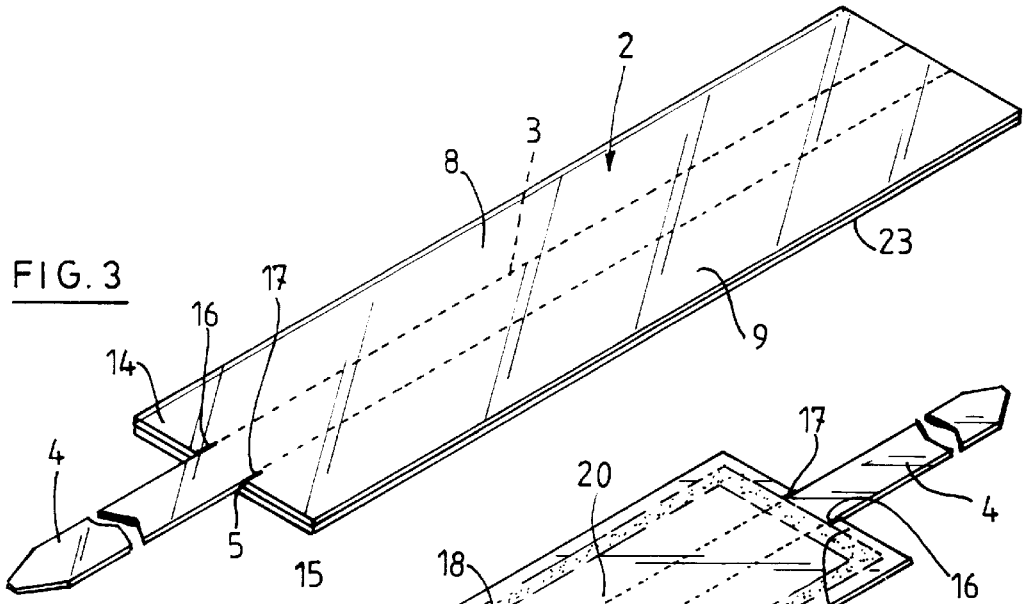
FIG. 3 is a perspective view of a seal according to the invention with a covering protecting sheet.
Figure 4:
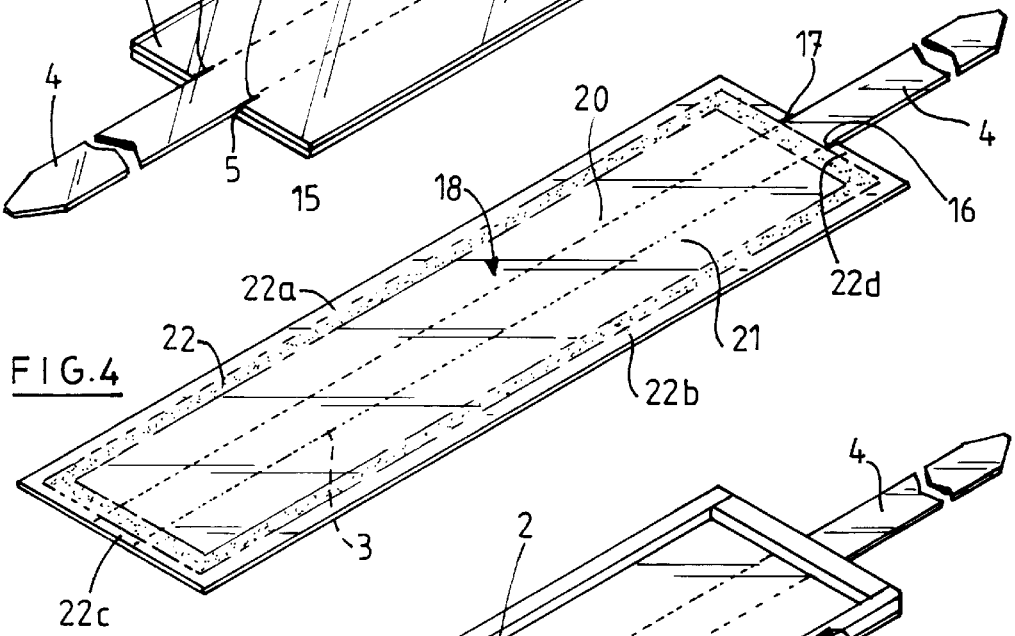
FIG. 4 is a back perspective view of the seal of FIG. 3 after removal of the covering protecting sheet.

FIGS. 3 and 4 show a seal of the invention. The seal comprises a plastic film without holes or apertures, but provided with a central strip 3 (defined on the figure between points 20,21) which, when torn, defines two lateral strips 8,9.

The seal 2 is provided at the first end part 5 of the central strip 3 with two parallel cuttings 16,17. Said cuttings 16,17 are situated between a part of the strip which is intended to be glued on the cartridge and end parts 14,15 of the seals, i.e. after tearing the end parts 14,15 of the lateral strips.

The seal 2 is provided, on one (18) of its faces, with glue 22 defining a rectangular path and with a protective sheet 23 which has first to be peeled off so as to attach the seal on a cartridge by means of the glue 22 (lateral lines 22*a,* 22*b* and cross lines 22*c,* 22*d*).

FIG. 4 shows the seal 2 after peeling of the protective sheet 23. As it can be seen from said Figure, the two parallel cuttings extend at most in the end part of the central strip 3 intended to be glued on the cartridge. The cuttings extend thus not through the glue (22*d*) from one lateral edge to the other lateral edge.

Figure 5:
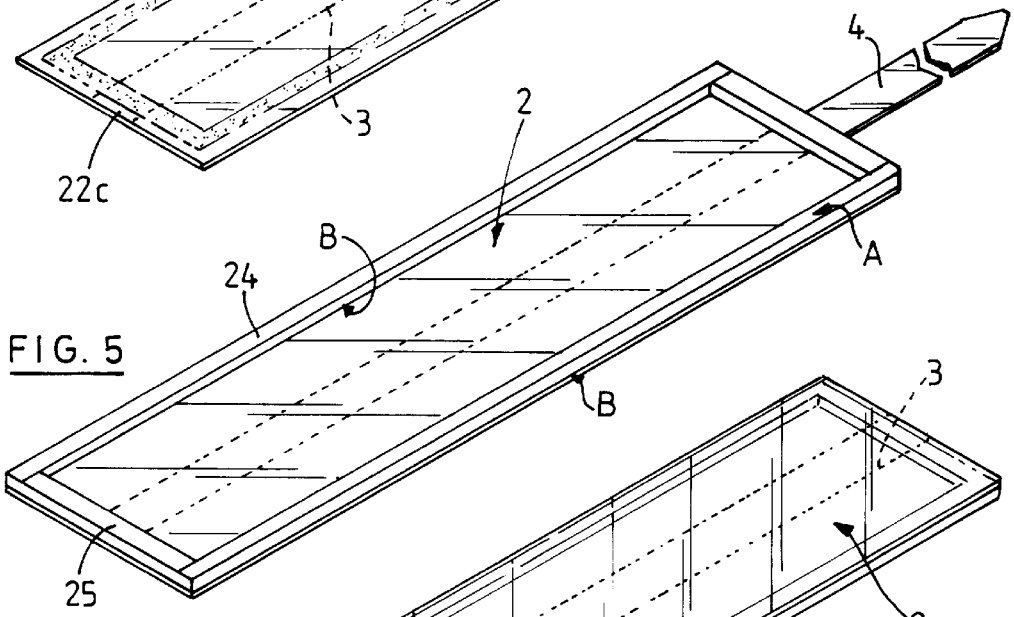
FIGS. 5 and 6 are perspective views of another embodiment of a seal according to the invention.
Figure 6:
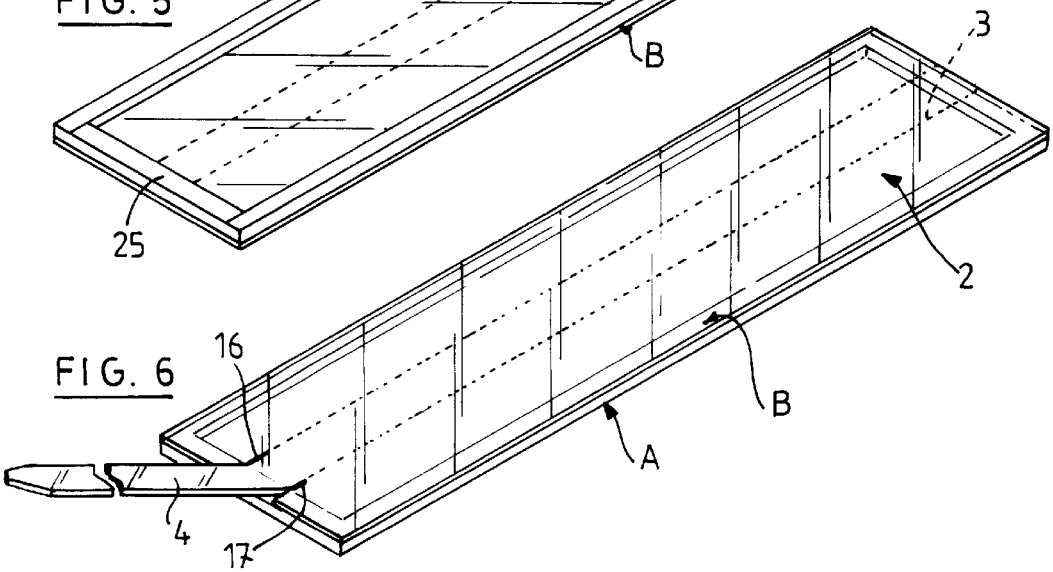

FIGS. 5 and 6 show another embodiment of a seal according to the invention.

Said seal 2 comprises a central longitudinal strip 3 and foam elements 24,25 located along the edges of the seal 2. The central strip 3 is linked to a tongue 4 suitable for the tearing operation. The foam elements are advantageously glued on the seal 2. The central strip 3 is provided at its end linked to the tongue 4 with cuttings 16,17 as described in the embodiment of FIG. 3.

For attaching said seal to a cartridge, it is possible to provide the cartridge with glue and then to apply and press the seal on the cartridge, but preferably glue is applied on the face A of the foam 24,25 intended to be applied or pressed on the cartridge.

Advantageously, glue is applied on opposite faces A,B of the foam elements and the seal is provided with a protective sheet to be peeled off before using the seal. The glue layer (face B) located between the seal 2 and the foam elements 24,25 has a higher adhesive force than that of the glue layer located on the face A of the foam 24,25 intended to be pressed or applied on the cartridge.

More preferably, the foam has a sufficient strength or mechanical property so that when a cartridge has to be re-used, it is possible to remove the remaining parts of the seal and the foam together, for example by applying a sufficient tearing or pulling force, without breaking the foam in two parts (i.e. a part still attached to the toner cartridge and a part removed with the remaining parts of the seal).

FIGS. 7 and 8 show a further embodiment of a seal 2 according to the invention. Said seal 2 consists of a central strip 3 which can be torn by pulling a tongue 4. The first end part 5 of the central strip 3 is similar to that shown in FIG. 1.

The opposite faces of the seal 2 are provided with a slotted foam insert 26,27 for example by means of a layer of glue.

The tongue 4 is curved at the first end part 5 of the central strip and extends along the upper face of the seal (i.e. the face not intended to be directed toward the inner volume of the cartridge) and then between the second end part 6 of the central strip 3 and the foam insert 26, before extending outside of the seal.

The foam insert 27 has a face provided with a glue layer covered with a protective sheet 23 intended to be peeled off before attaching the foam insert to a toner cartridge.

Figure 9:
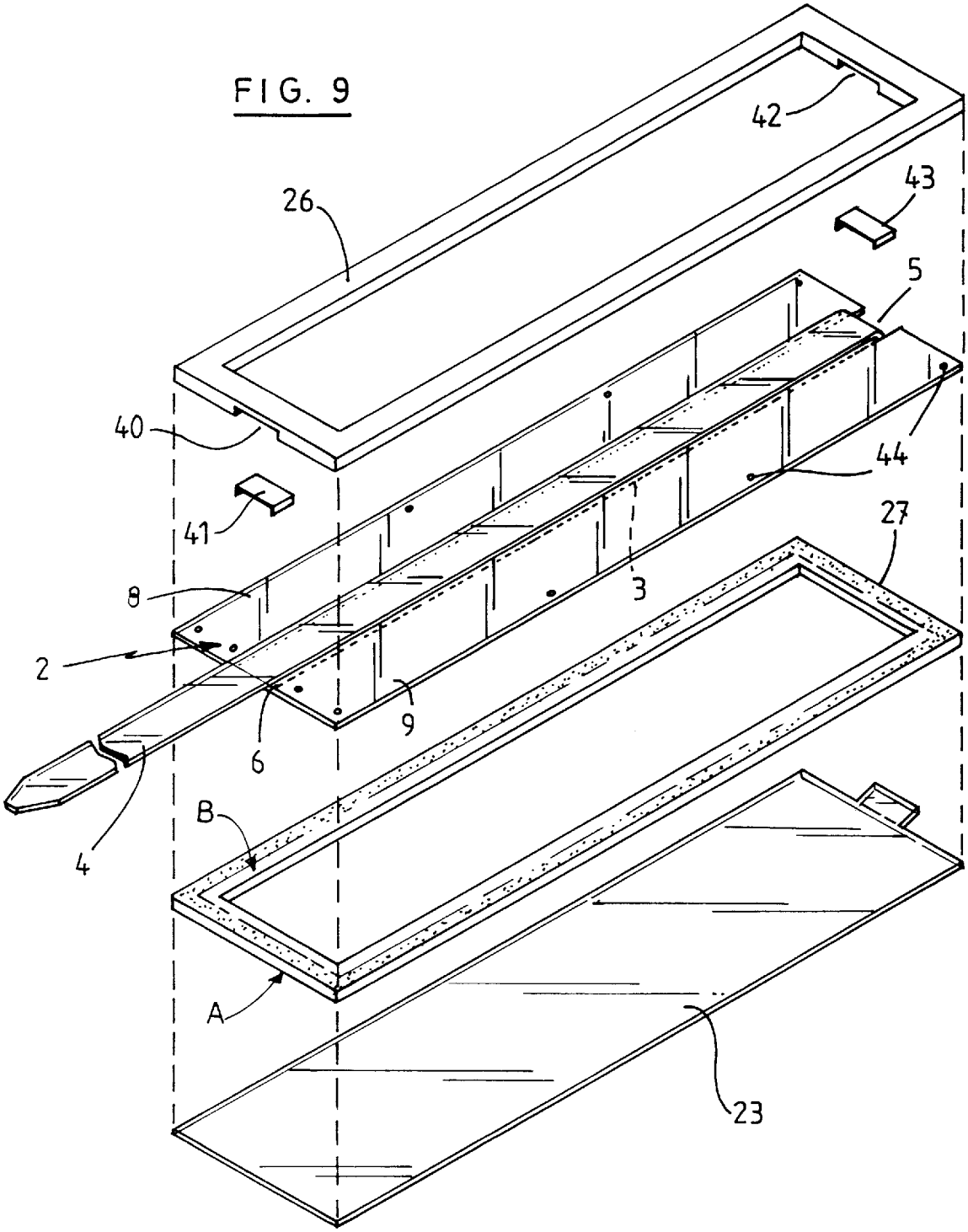
FIG. 9 is an exploded view of FIG. 7.

As it can be seen from FIG. 9, the tongue 4 passes through an opening 40 located between the slotted foam insert 26 and the seal near the second end part 6 of the central strip 3. Advantageously a rigid bridge 41 can be placed in said opening so as to avoid that the foam 26 exerts a force on the tongue 4. In order to avoid any force due to the foam on the tongue 4, the foam insert 26 can possibly be cut so that no foam remains above the central strip 3, i.e. on the face not extended to be directed towards the cartridge.

As the seal of FIG. 9 is intended to be placed between a toner cartridge and a support for a toner roller, the foam inserts 26,27 are pressed and therefore exert a force on the seal. Due to the bridge 41, or a lack of glue between the strip and the foam layer the lateral strips 8,9 of the seal 2 are pressed against the toner cartridge whereby the binding force of said parts (i.e. parts which are not intended to be torn off) on the toner cartridge is higher than the binding force of the strip on the cartridge.

In the embodiment shown, which is a preferred one, the end of the tongue adjacent to the first end part 5 of the strip is cured and extends in a recess or opening 42 of the slotted foam insert 26 so as to limit or avoid that the foam insert 26 exerts a force on the central strip 3 or on the tongue 4. A bridge 43 can be used as explained for the opening 40.

The slotted foam insert 26 is provided with glue only on its face directed towards the seal 2. Said glue is only located at a few points 44 as only a few binding points are sufficient.

The foam insert 27 is provided on both faces A,B with a continuous glue layer, i.e. a layer extending along the peripheral edges of the foam.

Such a seal is especially suitable for, recycling toner cartridge assemblies in which the toner cartridge needs to be separated from a support of a toner roller (for example toner cartridge assemblies of the type NX Engine Canon, HP 3 SI, HP 4 SI).

Figure 11:
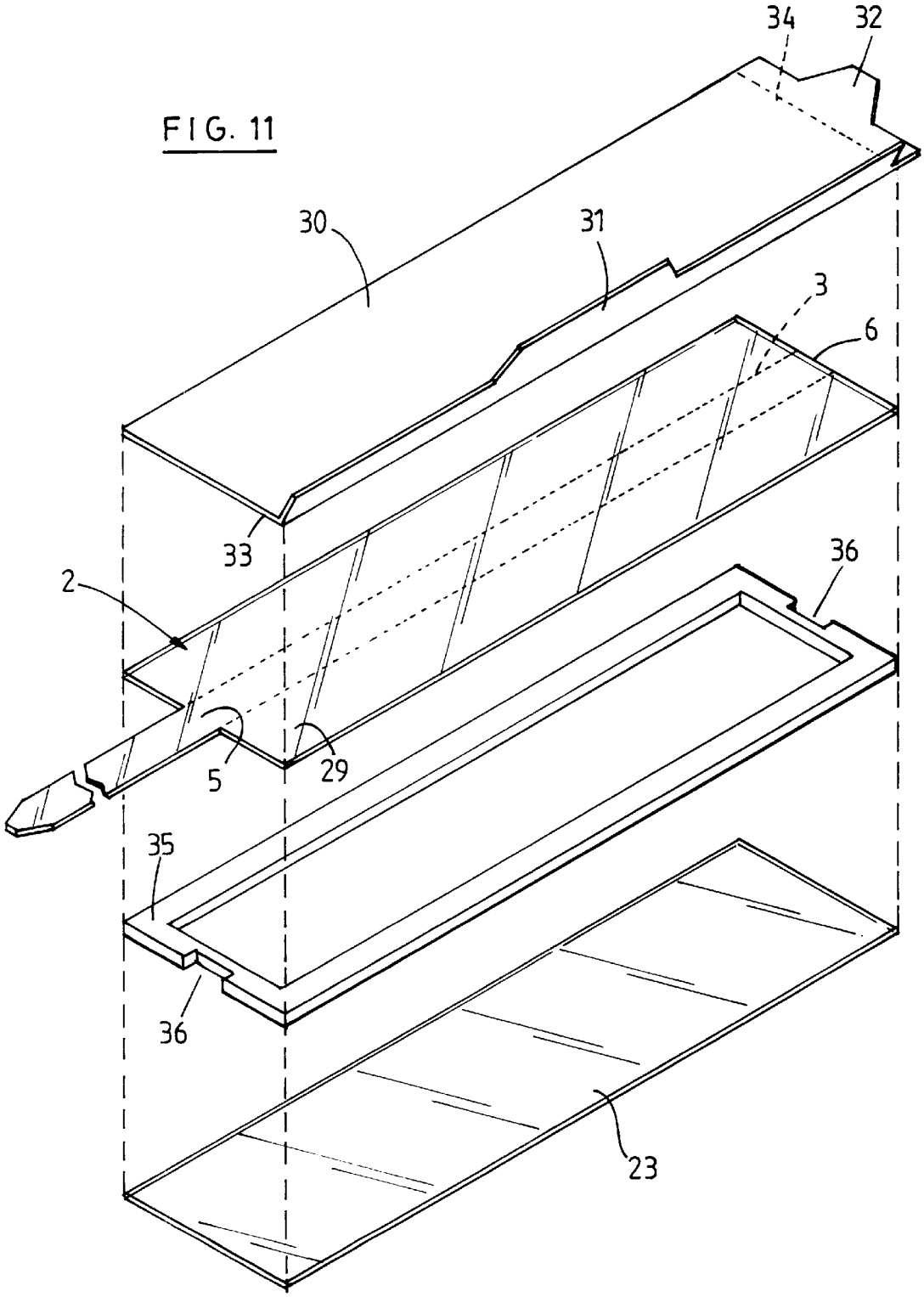
FIG. 11 is an exploded view of the seal of FIG. 10.
Figure 12:
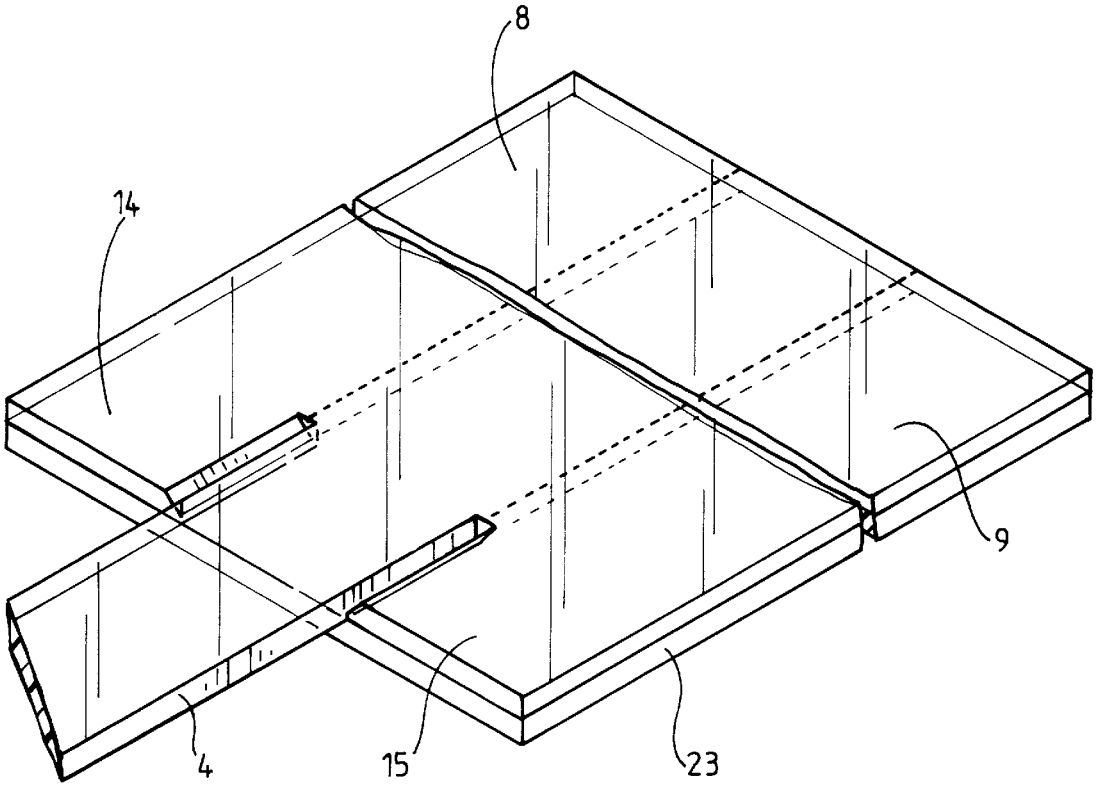
FIG. 12 is, on enlarged scale, a perspective view of a seal similar to that of FIG. 3, except that the cuttings 16, 17 have been replaced by grooves.

FIGS. 10 and 11 show an embodiment similar to that of FIG. 5, except that the face 29 of the seal not intended to be directed towards the inner volume of the cartridge is provided with a rigid support, 30, for example a cardboard support;

there is a peelable protective sheet 23 of the glue layer intended for attaching the slotted foam insert 35 to the cartridge;

there are two recesses 36 in the foam insert, said recess being located adjacent to the first end part 5 of the central strip 3 and to the second end part 6 of the central strip 3, whereby the tearing of the strip is facilitated at the beginning and the end of the tearing operation.

The cardboard support is suitable for the placement (after removal of the protective sheet 23 of the seal 2 on a cartridge. Said support 30 has advantageously one or two parts 31,32 which can be folded (folding lines 33,34), so as to give more rigidity to the support and so as to facilitate the placement or the removal of the support after placement of the seal. Preferably, the two parts which are able to be folded are located along two lateral edges of the seal.

What I claim is:

1. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, in which the seal has lateral parts intended to be attached by linking means to the toner cartridge, while said first end part of the strip is at least partly intended to be attached by a linking means to the toner cartridge, said means for lowering the tearing force extending at most in the end part of the strip intended to be attached by a linking means on the toner cartridge, said means for lowering the tearing force consisting of at least one aperture situated between the strip to be torn and a part of the seal which has not to be torn.

2. The seal of claim 1, in which at least one face of the part of the layer not intended to be torn out is at least partly provided with a glue layer for attaching it to a slotted support intended to be attached to the toner cartridge.

3. The seal of claim 2, in which said first end part of the strip is at least partly linked by means of a glue layer to the slotted support.

4. The seal of claim 1, in which at least one face of the part of the layer not intended to be torn out is at least partly provided with a glue layer for attaching it to the toner cartridge.

5. The seal of claim 4, in which said first end part of the strip is at least partly provided with a glue layer for attaching it to the toner cartridge.

6. The seal of claim 4, in which a face of the seal is provided with a foam layer intended to be linked to the toner cartridge.

7. The seal of claim 4, in which a face of the seal is provided at least along two opposite lateral parts thereof with foam, said foam being intended to be attached to the toner cartridge by means of a layer of glue.

8. The seal of claim 4, in which two opposite faces of the seal are provided at least along two opposite lateral parts thereof with foam, said seal being intended to be placed between a toner cartridge and a support for a toner roller.

9. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, in which the seal has lateral parts intended to be attached by linking means to the toner cartridge, while said first end part of the strip is at least partly intended to be attached by a linking means to the toner cartridge, said means for lowering the tearing force extending at most in the end part of the strip intended to be attached by a linking means to the toner cartridge, said means for lowering the tearing force consisting of two rows of holes between which the first end part of the strip is located, whereby said rows are situated between parts of the strip to be torn and parts of the seal which have not to be torn.

10. The seal of claim 9, in which at least one face of the part of the layer not intended to be torn out is at least partly provided with a glue layer for attaching it to a slotted support intended to be attached to the toner cartridge.

11. The seal of claim 10, in which said first end part of the strip is at least partly linked by means of a glue layer to the slotted support.

12. The seal of claim 9, in which at least one face of the part of the layer not intended to be torn out is at least partly provided with a glue layer for attaching it to the toner cartridge.

13. The seal of claim 12, in which said first end part of the strip is at least partly provided with a glue layer for attaching it to the toner cartridge.

14. The seal of claim 12, in which a face of the seal is provided with a foam layer intended to be linked to the toner cartridge.

15. The seal of claim 12, in which a face of the seal is provided at least along two opposite lateral parts thereof with foam, said foam being intended to be attached to the toner cartridge by means of a layer of glue.

16. The seal of claim 12, in which two opposite faces of the seal are provided at least along two opposite lateral parts thereof with foam, said seal being intended to be placed between a toner cartridge and a support for a toner roller.

17. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, in which the seal has lateral parts intended to be attached by linking means to the toner cartridge, while said first end part of the strip is at least partly intended to be attached by a linking means to the toner cartridge, said means for lowering the tearing force extending at most in the end part of the strip intended to be attached by a linking means on the toner cartridge, said means for lowering the tearing force consisting of two cuttings between which the first end part of the strip is located, whereby said cuttings are situated between a part of the strip to be torn and parts of the seal which have not to be torn.

18. The seal of claim 17, in which at least one face of the part of the layer not intended to be torn out is at least partly provided with a glue layer for attaching it to a slotted support intended to be attached to the toner cartridge.

19. The seal of claim 18, in which said first end part of the strip is at least partly linked by means of a glue layer to the slotted support.

20. The seal of claim 17, in which at least one face of the part of the layer not intended to be torn out is at least partly provided with a glue layer for attaching it to the toner cartridge.

21. The seal of claim 20, in which said first end part of the strip is at least partly provided with a glue layer for attaching it to the toner cartridge.

22. The seal of claim 20, in which a face of the seal is provided with a foam layer intended to be linked to the toner cartridge.

23. The seal of claim 20, in which a face of the seal is provided at least along two opposite lateral parts thereof with foam, said foam being intended to be attached to the toner cartridge by means of a layer of glue.

24. The seal of claim 20, in which two opposite faces of the seal are provided at least along two opposite lateral parts thereof with foam, said seal being intended to be placed between a toner cartridge and a support for a toner roller.

25. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, in which the seal has lateral parts intended to be attached by linking means to the toner cartridge, while said first end part of the strip is at least partly intended to be attached by a linking means to the toner cartridge, said means for lowering the tearing force extending at most in the end part of the strip intended to be attached by a linking means to the toner cartridge, said means for lowering the tearing force consisting of two grooves between which the first end part of the strip is located, whereby said grooves are situated between a part of the strip to be torn and parts of the seal which have not to be torn.

26. The seal of claim 25, in which at least one face of the part of the layer not intended to be torn out is at least partly provided with a glue layer for attaching it to a slotted support intended to be attached to the toner cartridge.

27. The seal of claim 26, in which said first end part of the strip is at least partly linked by means of a glue layer to the slotted support.

28. The seal of claim 25, in which at least one face of the part of the layer not intended to be torn out is at least partly provided with a glue layer for attaching it to the toner cartridge.

29. The seal of claim 28, in which said first end part of the strip is at least partly provided with a glue layer for attaching it to the toner cartridge.

30. The seal of claim 28, in which a face of the seal is provided with a foam layer intended to be linked to the toner cartridge.

31. The seal of claim 28, in which a face of the seal is provided at least along two opposite lateral parts thereof with foam, said foam being intended to be attached to the toner cartridge by means of a layer of glue.

32. The seal of claim 28, in which two opposite faces of the seal are provided at least along two opposite lateral parts thereof with foam, said seal being intended to be placed between a toner cartridge and a support for a toner roller.

33. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, in which the seal has lateral parts intended to be attached by linking means to the toner cartridge, while said first end part of the strip is at least partly intended to be attached by a linking means to the toner cartridge, said means for lowering the tearing force extending at most in the end part of the strip intended to be attached by a linking means to the toner cartridge, said means for lowering the tearing force consisting of an opening situated adjacent to said first end part and between two parts of the seal which have not to be torn.

34. The seal of claim 33, in which at least one face of the part of the layer not intended to be torn out is at least partly provided with a glue layer for attaching it to a slotted support intended to be attached to the toner cartridge.

35. The seal of claim 34, in which said first end part of the strip is at least partly linked by means of a glue layer to the slotted support.

36. The seal of claim 33, in which at least one face of the part of the layer not intended to be torn out is at least partly provided with a glue layer for attaching it to the toner cartridge.

37. The seal of claim 36, in which said first end part of the strip is at least partly provided with a glue layer for attaching it to the toner cartridge.

38. The seal of claim 36, in which a face of the seal is provided with a foam layer intended to be linked to the toner cartridge.

39. The seal of claim 36, in which a face of the seal is provided at least along two opposite lateral parts thereof with foam, said foam being intended to be attached to the toner cartridge by means of a layer of glue.

40. The seal of claim 36, in which two opposite faces of the seal are provided at least along two opposite lateral parts thereof with foam, said seal being intended to be placed between a toner cartridge and a support for a toner roller.

41. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, in which the seal has lateral parts intended to be attached by linking means to the toner cartridge, while said first end part of the strip is at least partly intended to be attached by a linking means to the toner cartridge, said means for lowering the tearing force extending at most in the end part of the strip intended to be attached by a linking means to the toner cartridge, said means for lowering the tearing force consisting of an opening situated adjacent to said first end part and between two parts of the seal which are intended to be attached by a linking means to the toner cartridge.

42. The seal of claim 41, in which at least one face of the part of the layer not intended to be torn out is at least partly provided with a glue layer for attaching it to a slotted support intended to be attached to the toner cartridge.

43. The seal of claim 42, in which said first end part of the strip is at least partly linked by means of a glue layer to the slotted support.

44. The seal of claim 41, in which at least one face of the part of the layer not intended to be torn out is at least partly provided with a glue layer for attaching it to the toner cartridge.

45. The seal of claim 44, in which said first end part of the strip is at least partly provided with a glue layer for attaching it to the toner cartridge.

46. The seal of claim 44, in which a face of the seal is provided with a foam layer intended to be linked to the toner cartridge.

47. The seal of claim 44, in which a face of the seal is provided at least along two opposite lateral parts thereof with foam, said foam being intended to be attached to the toner cartridge by means of a layer of glue.

48. The seal of claim 44, in which two opposite faces of the seal are provided at least along two opposite lateral parts thereof with foam, said seal being intended to be placed between a toner cartridge and a support for a toner roller.

49. A seal used to permit the re-charging of a toner cartridge assembly used in printers, copy machines and facsimile machines, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, whereby the strip is provided at its first end part with a means lowering the tearing force required when starting to tear the strip with respect to the tearing force required for tearing another part of the strip, wherein said seal is linked on two opposite faces to a glue layer, a first glue layer being intended to contact the toner cartridge while the other glue layer is in contact with a substantially rigid support, suitable to place correctly the seal on the toner cartridge whereby a second glue layer exerts a gluing force between the support and the seal which is lower than the gluing force of the first glue layer between the seal and the toner cartridge, so that after placing the seal, the support can be removed without damaging the seal.

50. A seal according to claim 49, in which the second glue layer has a first face directed towards the support and a second face directed towards the seal, the gluing force of the first face being higher than the gluing force on the second face.

51. A seal according to claim 49, in which the first glue layer is covered by a protective element intended to be removed before the placement of the seal.

52. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, the layer being unperforated in its part intended to close the passage of toner out of the cartridge, whereby at least one aperture is situated between the strip to be torn and a part of the seal which has not to be torn, said aperture being adjacent to the first end part of the strip.

53. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, the layer being unperforated in its part intended to close the passage of toner out of the cartridge, whereby adjacent to the first end part of the strip, two rows of holes are situated between parts of the strip to be torn and parts of the seal which have not to be torn.

54. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, the layer being unperforated in its part intended to close the passage of toner out of the cartridge, whereby adjacent to the first end part of the strip, two cuttings are situated between a part of the strip to be torn and parts of the seal which have not to be torn.

55. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, the layer being unperforated in its part intended to close the passage of toner out of the cartridge, whereby adjacent to the first end part of the strip, two grooves are situated between a part of the strip to be torn and parts of the seal which have not to be torn.

56. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, the layer being unperforated in its part intended to close the passage of toner out of the cartridge, whereby adjacent to the first end part of the strip, an opening is situated between two parts of the seal intended to be attached on the cartridge and which have not to be torn.

57. A seal for a toner cartridge assembly used in printers, copy machines and facsimile machines and preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of the strip up to another end part of the strip, whereby when the first end part of the strip is not torn, the strip prevents the loss of toner from the cartridge, while when the strip is torn up to said another end part, the opening for the passage of toner is formed, a part of the seal adjacent to the first end part of the strip and which is not intended to be torn is provided with a means intended to increase the binding of said part of the seal on the cartridge, in which said seal is provided at least along two opposite lateral parts thereof with foam, said foam being intended to be attached to the toner cartridge by means of a layer of glue.

58. The seal of claim 57, whereby two opposite faces of the seal are provided at least along two opposite lateral parts thereof with foam, said seal being intended to be placed between a toner cartridge and a support for a toner roller.

59. The seal of claim 58, whereby the foam is glued on the faces of the seal.

60. The seal of claim 58, whereby the seal is provided on its two opposite faces with a slotted foam insert, whereby the element to be pulled for tearing is engaged through an opening between a part of a foam insert and the seal, said part of the foam being not provided with glue.

61. The seal of claim 58, whereby the seal is provided on its two opposite faces with a slotted foam insert, whereby the element to be pulled for tearing is engaged through an opening between a part of a foam insert and the seal, a means being located between said part of the foam insert and the seal so as to facilitate the pulling of the element.

62. The seal of claim 58, whereby the seal is provided on its two opposite faces with a slotted foam insert, whereby the element to be pulled for tearing is engaged through a part of a foam insert and the seal, a means being located between said part of the foam insert and the seal so as to facilitate the pulling of the element, said means being a bridge so as to avoid that the element is pressed between the foam insert and the seal.

63. The seal of claim 58, whereby the seal is provided on its two opposite faces with a slotted foam insert, whereby the element to be pulled for tearing is engaged through a part of a foam insert and the seal, a means being located between said part of the foam insert and the seal so as to facilitate the pulling of the element, said means being a bridge intended to limit the pressure exerted by the foam insert on the element.

64. A toner cartridge assembly used in printers, copy machines and facsimile machines, said cartridge being provided with a seal for preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of which up to another end part of which, whereby when the first end part of the strip has not been torn, the strip prevents the loss of toner from the cartridge, while when the strip has torn up to said another end part, the opening for the passage of toner is formed, whereby the strip is provided at its first end part with a means lowering the tearing force required when starting to tear the strip, in which the seal has lateral parts attached by linking means on the toner cartridge, while said first end part of the strip is at least partly attached by a linking means to the toner cartridge, said means for lowering the tearing force extending at most in the end part of the strip attached by a linking means to the toner cartridge, said means for lowering the tearing force consisting of at least one aperture situated between the strip to be torn and a part of the seal which has not to be torn.

65. A toner cartridge assembly used in printers, copy machines and facsimile machines, said cartridge being provided with a seal for preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of which up to another end part of which, whereby when the first end part of the strip has not been torn, the strip prevents the loss of toner from the cartridge, while when the strip has torn up to said another end part, the opening for the passage of toner is formed, whereby the strip is provided at its first end part with a means lowering the tearing force required when starting to tear the strip, in which the seal has lateral parts attached by linking means to the toner cartridge, while said first end part of the strip is at least partly attached by a linking means to the toner cartridge, said means for lowering the tearing force extending at most in the end part of the strip attached by a linking means to the toner cartridge, said means for lowering the tearing force consisting of two rows of holes between which the first end part of the strip is located, whereby said rows are situated between parts of the strip to be torn and parts of the seal which have not to be torn.

66. A toner cartridge assembly used in printers, copy machines and facsimile machines, said cartridge being provided with a seal for preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of which up to another end part of which, whereby when the first end part of the strip has not been torn, the strip prevents the loss of toner from the cartridge, while when the strip has torn up to said another end part, the opening for the passage of toner is formed, whereby the strip is provided at its first end part with a means lowering the tearing force required when starting to tear the strip, in which the seal has lateral parts attached by linking means to the toner cartridge, while said first end part of the strip is at least partly attached by a linking means to the toner cartridge, said means for lowering the tearing force extending at most in the end part of the strip attached by a linking means to the toner cartridge, said means for lowering the tearing force consisting of two cuttings between which the first end part is located, whereby said cuttings are situated between a part of the strip to be torn and parts of the seal which have not to be torn.

67. A toner cartridge assembly used in printers, copy machines and facsimile machines, said cartridge being provided with a seal for preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of which up to another end part of which, whereby when the first end part of the strip has not been torn, the strip prevents the loss of toner from the cartridge, while when the strip has torn up to said another end part, the opening for the passage of toner is formed, whereby the strip is provided at its first end part with a means lowering the tearing force required when starting to tear the strip, in which the seal has lateral parts attached by linking means on the toner cartridge, while said first end part of the strip is at least partly attached by a linking means to the toner cartridge, said means for lowering the tearing force extending at most in the end part of the strip attached by a linking means to the toner cartridge, said means for lowering the tearing force consisting of two grooves between which the first end part is located, whereby said grooves are situated between a part of the strip to be torn and parts of the seal which have not to be torn.

68. A toner cartridge assembly used in printers, copy machines and facsimile machines, said cartridge being provided with a seal for preventing the loss of toner from said cartridge assembly during handling and shipment, said seal comprising a layer from which a strip can be torn out so as to define an opening for the passage of toner with respect to the part of the layer which has not been torn out, said strip being linked to an element to be pulled for tearing the strip from a first end part of which up to another end part of which, whereby when the first end part of the strip has not been torn, the strip prevents the loss of toner from the cartridge, while when the strip has torn up to said another end part, the opening for the passage of toner is formed, whereby the strip is provided at its first end part with a means lowering the tearing force required when starting to tear the strip, in which the seal has lateral parts attached by linking means on the toner cartridge, while said first end part of the strip is at least partly attached by a linking means to the toner cartridge, said means for lowering the tearing force extending at most in the end part of the strip attached by a linking means to the toner cartridge, said means for lowering the tearing force consisting of an opening situated adjacent to said first end part between two parts of the seal which have not been torn.

*69. A seal used to permit the re-charging of a toner cartridge assembly used in printers, copy machines and facsimile machines, said seal comprising a layer from which a strip can be torn so as to define an opening for the passage of toner with respect to the part of the layer which has not been torn, said strip being linked to an element to be pulled for tearing the strip from a first end part of the strip to another end part of the strip, whereby when the first end part of the strip is not torn, the strip prevents the loss of toner from the cartridge, while when the strip is torn to said another end part, the opening for the passage of toner is formed, wherein said seal is linked on two opposite faces to a glue layer, a first glue layer being intended to contact the toner cartridge while the other glue layer is in contact with a substantially rigid support, suitable to place correctly the seal on the toner cartridge whereby a second glue layer exerts a gluing force between the support and the seal which is lower than the gluing force of the first glue layer between the seal and the toner cartridge, so that after placing the seal, the support can be removed without damaging the seal.*

*70. A seal according to claim 69 in which the second glue layer has a first face directed toward the support and a second face directed toward the seal, the gluing force of the first face being higher than the gluing force on the second face.*

*71. In a seal to permit the re-charging of a toner cartridge assembly, said seal comprising a layer from which a strip can be torn so as to define an opening for the passage of toner with respect to a part of the layer which has not been torn, said strip being linked to an element to be pulled for tearing the strip from a first end part of the strip to another end part of the strip, the improvement comprising: a rigid support of length substantially corresponding to that of said seal, and releasably engaged upon a surface of said seal over substantially the entire length thereof prior to placement of said seal in position upon said toner cartridge, said support being thereafter disengaged from said seal.*

*72. The improvement as set forth in claim 71, in which said support includes a portion which is folded about a longitudinally extending edge thereof to provide further rigidity to said support along the length thereof.*

*73. The improvement set forth in claim 71 in which said support includes a portion which is folded about a transversely extending edge to provide further rigidity to said support along the width thereof.*

*74. The improvement according to claim 71 in which said support is adhesively attached to said seal.*

*75. The improvement in accordance with claim 71 in which said support is attached to said seal by a first adhesive layer, said seal being attached to said toner cartridge by a second adhesive layer, said first adhesive layer exerting an adhesive force which is less than the adhesive force exerted by said second adhesive layer.*

* * * * *